Patented May 22, 1934

1,959,446

UNITED STATES PATENT OFFICE 1,959,446

PURIFICATION OF ORGANIC ESTERS OF CELLULOSE

Jacques Scheidegger, Cumberland, Md., assignor to Celanese Corporation of America, a corporation of Delaware No Drawing. Application February 7, 1929, Serial No. 338,339

20 Claims. (Cl. 260—102)

This invention relates to the purification of organic esters of cellulose, such as cellulose acetate, and relates more particularly to a treatment of the organic ester of cellulose whereby the temperature at which the same is decomposed is materially raised.

An object of my invention is to treat organic esters of cellulose in such a manner that the heat resistance thereof is increased.

A further object of my invention is to purify organic esters of cellulose by fractional crystallization or precipitation, whereby at least some of the impurities or ingredients that lower the clarity, heat test, or viscosity characteristics thereof are removed. Further objects of my invention will appear from the following detailed description.

I have found that organic esters of cellulose, such as cellulose acetate, as ordinarily made in commercial practice, consists of ingredients or constituents that differ among each other in solubility in solvents such as acetone, and these ingredients or constituents also differ with respect to their heat resistance and viscosity characteristics. I have found that the more soluble constituents of the organic derivatives of cellulose, such as cellulose acetate, have a lower heat resistance and lower viscosity characteristics, and that therefore the heat resistance of such organic esters of cellulose may be increased by the removal of the more soluble constituents.

In accordance with my invention, I increase the heat resistance of an organic ester of cellulose by dissolving the same in a suitable solvent or solvent mixture and then fractionally crystallizing or precipitating the purified organic ester of cellulose from the solution.

Any suitable organic ester of cellulose may be treated by my invention, examples of which are cellulose acetate, cellulose formate, cellulose propionate and cellulose butyrate.

While ordinary solvents may be employed in my invention, I prefer to employ solvents or solvent mixtures whose solvent power varies greatly at different easily accessible temperatures, since by the use of such solvents or solvent mixtures the manipulation of the process is greatly facilitated. The best solvent or solvent mixture to be employed is one which has a comparatively great solvent power for the organic ester of cellulose at elevated temperature, but which has little or no solvent power at lower temperatures, e. g. ordinary room temperatures. Likewise solvents or solvent mixtures which are solvents for organic esters of cellulose only when heated under pressure may be employed. Examples of suitable solvent mixtures for use in the purification of cellulose acetate are mixtures of benzene and ethyl alcohol or mixtures of benzene and methyl alcohol. The mixtures may contain from 70 to 40 parts of benzene and 30 to 60 parts of methyl alcohol respectively; or the mixtures may contain from 60 to 35 parts of benzene and 40 to 65 parts of ethyl alcohol respectively, the parts being by volume. Generally I have found that equal volumes of the benzene and the alcohol, either methyl or ethyl give very satisfactory results. As to the proportions above given, mixtures beyond these limits still exhibit a solvent power for cellulose acetate under proper temperature conditions, and these different proportions may also be employed.

The addition of water or other diluents to the above solvent mixtures within those limits within which it does not cause any undesirable changes in the solvent power of the solvent mixture, is not precluded and is often desirable.

The organic derivative of cellulose may be dissolved in the above solvents or solvent mixtures to any suitable concentration. In the treatment of cellulose acetate, I have found that if solutions having a concentration of 5 to 15% of cellulose acetate are formed, very good results are obtained.

After dissolving the organic ester of cellulose in the above solvents or solvent mixtures, the main bulk of the organic ester of cellulose is precipitated out by reduction of the temperature. However, in the preferred form, where solvents or solvent mixtures which have vastly different solvent powers at different temperatures are employed, precipitation or crystallization of the organic ester of cellulose is obtained by changing the temperature to obtain such precipitation. Thus when mixtures of benzene and ethyl or methyl alcohol are employed, the solutions are made at temperatures above 30° to 50° C., and then precipitation or crystallization is caused by reducing the temperature of the solution below these temperatures.

The organic ester of cellulose that is crystallized or precipitated out is filtered or otherwise removed from the mother liquor. The more soluble constituents of the organic ester of cellulose remain in the solution or mother liquor, and since these more soluble constituents have lower heat resistance, lower viscosity characteristics, and are more degraded, the organic esters of cellulose that crystallize or precipitate out have a greater heat resistance, higher viscosity characteristics, and films formed from them are less brittle than those formed from untreated organic esters of cellulose.

The mother liquor that is recovered may be employed again as a solvent for a new batch of organic esters of cellulose to be treated, and the mother liquor may be reused until it has dissolved therein so much of the poor quality organic ester of cellulose that it is no longer useful. The mother liquor may then be distilled to recover the solvent or solvent mixture.

For further purification of the organic esters of cellulose, the solution of the same, prior to crystallization or precipitation, may be filtered through suitable filtering media to remove foreign matter such as soot, dirt, pieces of wood, fibres from the bags in which they are stored, etc.

If desired, the organic ester of cellulose that has been purified by crystallization or precipitation from solutions of the same may be subjected to further treatment by repeating this crystallization or precipitation process as many times as is required to attain the degree of purity desired, although generally only one treatment is sufficient.

The organic ester of cellulose that has been purified by my process has an increased heat test of from 5 to 25° C. or more. Because of this increased resistance to heat, yarns, filaments or fabrics containing these purified esters of cellulose may be safely ironed at higher temperatures. As recovered from the process, the organic ester of cellulose retains some residual liquid and the same may be gelatinized immediately for making plastics. The esters of cellulose purified by my process are eminently suitable for use in making lacquers, artificial filaments or yarns, films, plastic masses or molding powder.

In order further to illustrate my invention but without being limited thereto, the following specific examples are given.

Example I 50 parts by weight of an acetone soluble cellulose acetate which decomposes between 220° and 230° C. are dissolved in 450 parts by weight of a solvent mixture consisting of 50 volumes of benzene, 50 volumes of methyl alcohol and 3 volumes of water. In order to obtain solution of the cellulose acetate in the solvent mixture, the same is heated under reflux with stirring. Upon cooling, the cellulose acetate begins settling out at about 35° C. and cooling is continued until a temperature of 25° C. is attained. The cellulose acetate that crystallizes or precipitates out is separated from the solvent. This material decomposes when heated to a temperature of 240° to 250° C. If the cooling is continued to 0° C., instead of interrupting the same at 25° C., the cellulose acetate that is precipitated out decomposes at 235° C. to 245° C.

The mother liquor recovered from this process may be used again. Thus if a mother liquor that has been twice used for crystallizing out the cellulose acetate is employed, the ester separating from such solution above 25° C. decomposes at 240° to 250° C.

Example II 50 parts by weight of the cellulose acetate employed in Example I is dissolved in 450 parts by weight of a solvent mixture consisting of 55 volumes of benzene and 45 volumes of commercial ethyl alcohol in the same manner as described above. Upon cooling the solution starts crystallizing at about 49° C. The fraction collected between 49° C. and 25° C. decomposes at 240° to 250° C., while if the cooling is permitted to proceed to 0° C., the cellulose acetate thus collected decomposes at 235° to 245° C.

Example III 50 parts by weight of the cellulose acetate employed in Example I are dissolved in 450 parts by weight of a mixture of benzene and ethyl alcohol mother liquor, which mother liquor has been twice used previously for crystallizing out cellulose acetate, and the original composition of which are 50 parts of benzene and 45 parts of ethyl alcohol by volume. The fraction of the cellulose acetate crystallizing out above 25° C. decomposes at 240° to 250° C.

That part of the cellulose acetate that remains behind in the various mother liquors of the above examples decomposes at about 220° C. and has viscosity characteristics of 0.9 as against a viscosity characteristic of 20.9 of the untreated cellulose acetate, in certain arbitrary units.

Having described my invention, what I claim and desire to secure by Letters Patent is:

1. Process for the treatment of an organic ester of cellulose comprising separating it into at least two fractions by precipitating a part only of the cellulose ester present in a solution of the same and separating the precipitated portion from the solution which still contains part of the cellulose ester.

2. Process for the treatment of cellulose acetate comprising separating it into at least two fractions by precipitating a part only of the cellulose acetate present in a solution of the same and separating the precipitated portion from the solution which still contains part of the cellulose acetate.

3. Process for the treatment of an organic ester of cellulose comprising separating it into two fractions by precipitating a part only of the cellulose ester present in the solution of the same and separating the precipitated portion from the solution which still contains part of the cellulose ester.

4. Process for the treatment of cellulose acetate comprising separating it into two fractions by precipitating a part only of the cellulose acetate present in the solution of the same and separating the precipitated portion from the solution which still contains part of the cellulose acetate.

5. Process in accordance with claim 1, wherein the solvent employed in the solution is a mixture of benzene and alcohol.

6. Process in accordance with claim 4, wherein the solvent employed in the solution is a mixture of benzene and alcohol.

7. Process in accordance with claim 2, wherein the solvent employed in the solution is a mixture of benzene and ethyl alcohol.

8. Process in accordance with claim 1, wherein the precipitation is effected by the addition of a non-solvent for the cellulose ester.

9. Process in accordance with claim 4, wherein the precipitation is effected by the addition of a non-solvent for the cellulose acetate.

10. Process for the treatment of an organic ester of cellulose comprising forming a solution of the organic ester of cellulose in a liquid that has decreasing solvent power for the same at decreasing temperatures and causing the cellulose ester to separate into at least two fractions by lowering the temperature of the same to cause part only of the cellulose ester to precipitate and separating the precipitated portion from the solution which still contains part of the cellulose ester.

11. Process for the treatment of cellulose acetate comprising forming a solution of cellulose acetate in a liquid which has decreasing solvent power for the same at decreasing temperatures and causing the cellulose acetate to separate into two fractions by lowering the temperature of the same to cause part only of the cellulose acetate to precipitate and separating the precipitated portion from the solution which still contains part of the cellulose acetate.

12. Method of improving the heat resistance of an organic ester of cellulose comprising dissolving the same in a solvent or solvent mixture, then causing the bulk but not all of the organic ester of cellulose to separate out in a solid form from the solution, and then removing the same from the solution, whereby an organic ester of cellulose of increased resistance to heat is obtained.

13. Method of improving the heat resistance of cellulose acetate comprising dissolving the same in a solvent or solvent mixture, then causing the bulk but not all of the cellulose acetate to separate out in a solid form from the solution, and then removing the same from the solution, whereby a cellulose acetate of increased resistance to heat is obtained.

14. Method of improving the heat resistance of an organic ester of cellulose comprising dissolving the same at elevated temperature in a solvent or solvent mixture that has greater solvent power at elevated temperatures than at lower temperatures, then reducing the temperature of the resultant solution to a point where a part only of the organic ester of cellulose crystallizes or precipitates out, and then removing the same from the solution.

15. Method of improving the heat resistance of cellulose acetate comprising dissolving the same at elevated temperature in a solvent or solvent mixture that has greater solvent power at elevated temperatures than at lower temperatures, then reducing the temperature of the resultant solution to a point where a part only of the cellulose acetate crystallizes or precipitates out, and then removing the same from the solution.

16. Method of improving the heat resistance of an organic ester of cellulose comprising dissolving the same in a mixture of benzene and an alcohol at elevated temperatures, then cooling the solution until the main bulk but not all of the organic ester of cellulose precipitates or crystallizes out, and removing the same from the solution, whereby an organic ester of cellulose of increased resistance to heat and greater clarity is obtained.

17. Method of improving the heat resistance of cellulose acetate comprising dissolving the same in a mixture of benzene and an alcohol at elevated temperatures, then cooling the solution until the main bulk but not all of the cellulose acetate precipitates or crystallizes out, and removing the same from the solution, whereby a cellulose acetate of increased resistance to heat and greater clarity is obtained.

18. Method of purifying organic esters of cellulose comprising dissolving the same in a solvent mixture comprising substantially 70 to 35 parts of benzene and substantially 30 to 65 parts of an alcohol at elevated temperatures, then cooling the same to a temperature below 50° C. until a substantial portion but not all of the organic ester of cellulose precipitates or crystallizes out, and then removing the same from the solution.

19. Method of purifying cellulose acetate comprising dissolving the same in a solvent mixture comprising substantially 70 to 35 parts of benzene and substantially 30 to 65 parts of alcohol at elevated temperatures, then cooling the same to a temperature below 50° C. until a substantial portion but not all of the cellulose acetate precipitates or crystallizes out, and then removing the same from the solution.

20. Process in accordance with claim 2, wherein the solvent employed in the solution is a mixture of benzene and methyl alcohol.

JACQUES SCHEIDEGGER.